(12) United States Patent
Liang et al.

(10) Patent No.: US 11,074,927 B2
(45) Date of Patent: Jul. 27, 2021

(54) ACOUSTIC EVENT DETECTION IN POLYPHONIC ACOUSTIC DATA

(71) Applicant: INTERNATIONAL BUSINESS MACHINES CORPORATION, Armonk, NY (US)

(72) Inventors: Xiao Xing Liang, Beijing (CN); Ning Zhang, Beijing (CN); Yu Ling Zheng, Beijing (CN); Yu Chen Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 931 days.

(21) Appl. No.: 15/798,462

(22) Filed: Oct. 31, 2017

(65) Prior Publication Data
US 2019/0130933 A1    May 2, 2019

(51) Int. Cl.
*G10L 25/30*    (2013.01)
*G06N 3/08*    (2006.01)
*G06N 3/04*    (2006.01)
*G10L 25/51*    (2013.01)

(52) U.S. Cl.
CPC ............ *G10L 25/30* (2013.01); *G06N 3/0445* (2013.01); *G06N 3/08* (2013.01); *G10L 25/51* (2013.01)

(58) Field of Classification Search
None
See application file for complete search history.

(56) References Cited

U.S. PATENT DOCUMENTS

| | | | |
|---|---|---|---|
| 8,581,086 B2 | 11/2013 | McMillen et al. | |
| 9,047,867 B2 * | 6/2015 | Smaragdis | G10L 15/142 |
| 9,721,202 B2 * | 8/2017 | Boulanger-Lewandowski | G06N 3/0445 |
| 2011/0247480 A1 | 10/2011 | Gehring et al. | |
| 2016/0099008 A1 * | 4/2016 | Barker | H04R 25/505 704/233 |
| 2017/0243571 A1 * | 8/2017 | Cogliati | G10G 1/04 |

OTHER PUBLICATIONS

Boulanger-Lewandowski, Modeling High-Dimensional Audio Sequences with Recurrent Neural Networks, University of Montreal Thesis, Apr. 2014, Total pp. 159 (Year: 2014).*
Giambattista Parascandolo, Recurrent Neural Networks for Polyphonic Sound Event Detection, Tampere University of Technology Master of Science Thesis, 2015, Total pp. 71 (Year: 2015).*

(Continued)

*Primary Examiner* — Alan Chen
(74) *Attorney, Agent, or Firm* — Reza Sarbakhsh (57) ABSTRACT

A computer implemented method, computer system and computer program product are provided for acoustic event detection in polyphonic acoustic data, according to the method, polyphonic acoustic data is inputted by one or more processing units into a trained neural network trained by labeled monophonic acoustic data, a first output from a hidden layer of the trained neural network is obtained by one or more processing units, and at least one acoustic classification of the polyphonic acoustic data is determined by one or more processing units based on the first output and a feature dictionary learnt from the trained neural network.

17 Claims, 6 Drawing Sheets

---

401 — inputting polyphonic acoustic data into a trained neural network trained by labeled monophonic acoustic data 403 — obtaining a first output from a hidden layer of the trained neural network 405 — determining at least one acoustic classification of the polyphonic acoustic data based on the first output and a feature dictionary learnt from the trained neural network (56) References Cited

OTHER PUBLICATIONS

Hanlon et al., Structure-Aware Dictionary Learning With Harmonic Atoms, 19th European Signal Processing Conference (EUSIPCO 2011), pp. 1761-1765 (Year: 2011).*

Boulanger-Lewandowski et al., Exploiting Long-Term Temporal Dependencies in NMF Using Recurrent Neural Networks With Application to Source Separation, 2014 IEEE International Conference on Acoustic, Speech and Signal Processing (ICASSP), pp. 6970-6973 (Year: 2014).*

Emre Cakir, Multilabel Sound Event Classification with Neural Networks, Tampere University of Technology Master of Science Thesis, 2014, Total pp. 70 (Year: 2014).*

Abdallah et al., "Unsupervised Analysis of Polyphonic Music by Sparse Coding," IEEE Transactions on Neural Networks, vol. 17, No. 1, January 2006, pp. 179-196.

Adavanne et al., "Sound Event Detection in Multichannel Audio Using Spatial and Harmonic Features," Detection and Classification of Acoustic Scenes and Events 2016, Sep. 3, 2016, Budapest, Hungary, pp. 1-5.

Benetos et al., "Detection of Overlapping Acoustic Events using a Temporally-Constrained Probabilistic Model," ICASSP, Mar. 2016, Submitted Feb. 23, 2016, Shanghai, China, 2016, pp. 1-6.

Cakir et al., "Polyphonic Sound Event Detection Using Multi Label Deep Neural Networks," International Joint Conference on Neural Networks (IJCNN), 2015, Oct. 1, 2015, Killarney, Ireland, Date of Conference: Jul. 12-17, 2015, pp. 1-7.

Hamel et al., "Automatic Identification of Instrument Classes in Polyphonic and Poly-Instrument Audio," 10th International Society for Music Information Retrieval Conference (ISMIR 2009) (Best Date Available), pp. 399-404.

Hayashi et al., "Bidirectional LSTM-HMM Hybrid Systemfor Polyphonic Sound Event Detection," Detection and Classification of Acoustic Scenes and Events 2016, Sep. 3, 2016, Budapest, Hungary, pp. 1-5.

Parascandolo et al., "Recurrent Neural Networks for Polyphonic Sound Event Detection in Real Life Recordings," Proc. ICASSP 2016, Mar. 20-25, 2016, Shanghai, China, Copyright IEEE 2016, pp. 1-5.

Mell et al., "The NIST Definition of Cloud Computing," National Institute of Standards and Technology, U.S. Department of Commerce, Special Publication 800-145, Sep. 2011, pp. 1-7.

Cakir et al., "Multi-Label vs. Combined Single-Label Sound Event Detection With Deep Neural Networks," 23rd European Signal Processing Conference, (2015), Aug. 31-Sep. 4, 2015, 2015, Nice, France, Date Added to IEEE Xplore: Dec. 28, 2015, pp. 1-5.

\* cited by examiner

ACOUSTIC EVENT DETECTION IN POLYPHONIC ACOUSTIC DATA

BACKGROUND

The present invention relates to data processing, and more specifically, to a computer implemented method, computer system and computer program product for acoustic event detection in polyphonic acoustic data.

Sounds carry a large amount of information about the environment in our daily life. There are numerous applications utilizing automatic acoustic analysis, e.g. sound surveillance systems, hearing aids, smart room monitoring and video content highlight generation, multimedia indexing and so on.

An important task in environmental analysis is the acoustic event detection, which is to detect whether an event is occurring and identify what the event is only based on acoustic analysis. Typically, multiple sound sources are emitting simultaneously in a real environment, thus resulting in multiple and overlapping sounds, namely polyphonic acoustic data. For example, we can hear the sounds of car passing by, people speaking, and people walking on the street simultaneously.

Acoustic event detection in polyphonic data, i.e., polyphonic acoustic event detection is to detect how many events are occurring at the moment and identify what these events are, which means that the overlapping acoustic events should be recognized separately.

There are many challenges in polyphonic acoustic event detection as it is much more intractable than monophonic acoustic event detection. One important reason is due to the lack of large amount of labeled polyphonic acoustic data. Labeling polyphonic acoustic data is to assign each acoustic track in the polyphonic acoustic data a series of annotations which contain names of the events occurred in the acoustic track and the start and end time of each event. Thus, the labeling of polyphonic acoustic data is a tedious and time-consuming job.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

According to one embodiment of the present invention, there is provided computer-implemented method. According to the method, polyphonic acoustic data is inputted into a trained neural network trained by labeled monophonic acoustic data by one or more processing units, and a first output is obtained from a hidden layer of the trained neural network by one or more processing units, and then at least one acoustic classification of the polyphonic acoustic data based on the first output and a feature dictionary learnt from the trained neural network is determined by one or more processing units.

According to another embodiment of the present invention, there is provided a computer system, the computer system comprises a processor and a computer-readable memory coupled to the processor. The memory comprises instructions that when executed by the processor perform a method. According to the method, polyphonic acoustic data is inputted into a trained neural network trained by labeled monophonic acoustic data by one or more processing units, and a first output is obtained from a hidden layer of the trained neural network by one or more processing units, and then at least one acoustic classification of the polyphonic acoustic data based on the first output and a feature dictionary learnt from the trained neural network is determined by one or more processing units.

According to another embodiment of the present invention, there is provided a computer program product. The computer program product comprises a computer readable storage medium having program instructions embodied therewith, the program instructions executable by a processor to cause the processor to perform a method. According to the method, polyphonic acoustic data is inputted into a trained neural network trained by labeled monophonic acoustic data by one or more processing units, and a first output is obtained from a hidden layer of the trained neural network by one or more processing units, and then at least one acoustic classification of the polyphonic acoustic data based on the first output and a feature dictionary learnt from the trained neural network is determined by one or more processing units.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
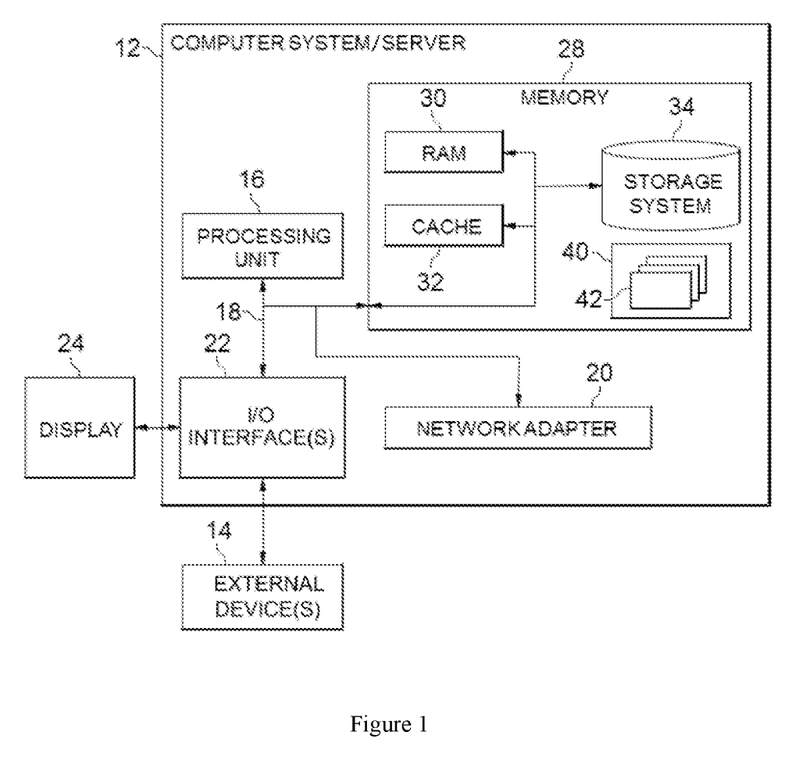
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
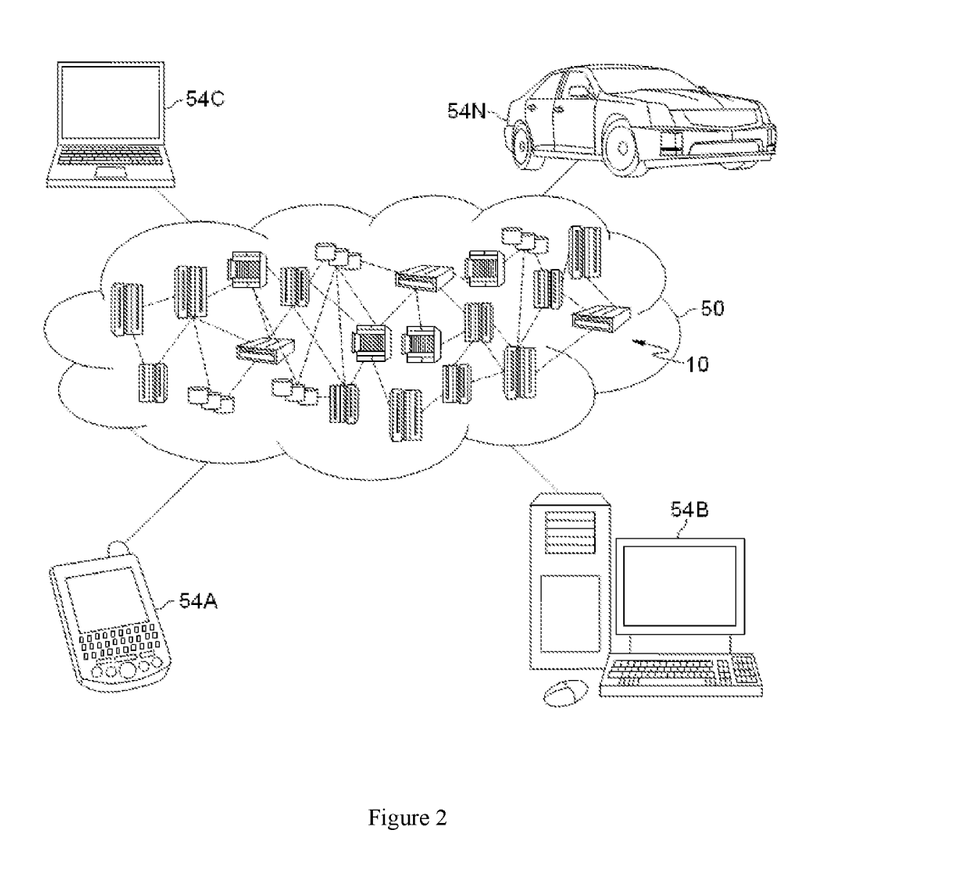
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
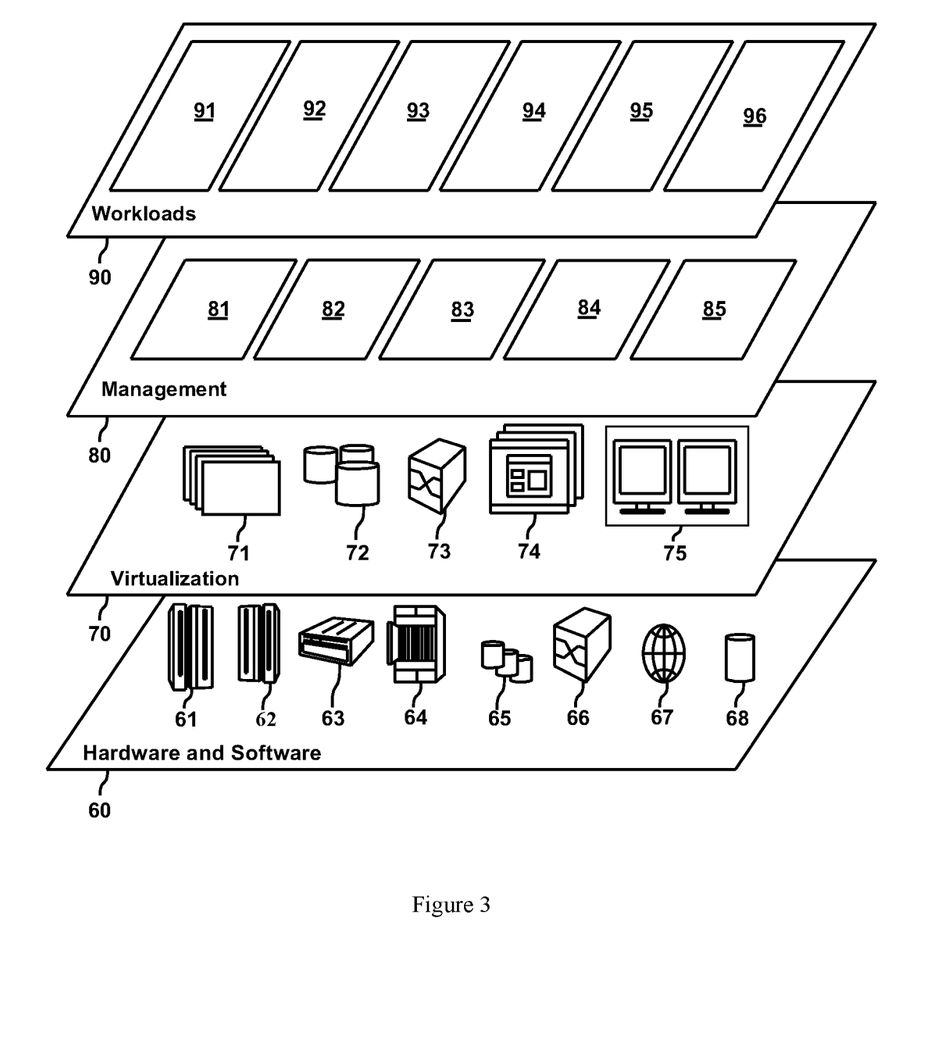
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and acoustic event detecting in polyphonic acoustic data 96.

As mentioned above, the labeling of polyphonic acoustic data is a big challenge as it requires a lot of time and efforts. Instead of labeling polyphonic acoustic data, the invention leverages labeled monophonic acoustic data. Monophonic acoustic data, as the name suggested, are sounds emitted by a single sound source, which can be also referred as monophonic tracks. For example, an audio contains only the sounds of cars passing by is a monophonic acoustic track as the sounds were emitted by the single sound source, i.e., the event of cars passing by. Labeling of a monophonic acoustic track is much easier than that of a polyphonic acoustic track. And, there are a large amount of labeled monophonic acoustic data available. Given the pre-existing conditions mentioned above, this invention utilizes them to provide a better solution for polyphonic acoustic event detection which will be described in the following.

Figure 4:
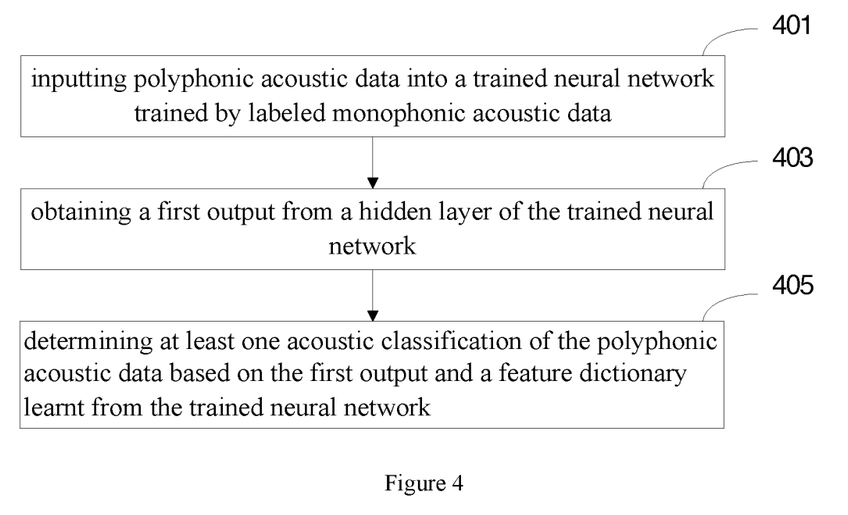
FIG. 4 is a flowchart illustrating an exemplary method according to an embodiment of the present invention.

With reference now to FIG. 4, which is a flowchart illustrating an exemplary method 400 according to an embodiment of the present invention. At block 401, polyphonic acoustic data are inputted into a trained neural network by one or more processing units, the trained neural network is trained by labeled monophonic acoustic data. Polyphonic acoustic data and monophonic acoustic data could be obtained via a pre-processing of original audio data, which are audio files in raw binary format, WAVE, MP3 or any other formats. An embodiment of the pre-processing is described in the following as:

(1) Framing: the original audio data are framed into overlapping or non-overlapping frames, each frame can be of equal length, e.g. 2,048 or 4,096 sample points.

(2) Feature extraction: features of each frame are extracted. Common features include Fourier spectrum, log-mel energy spectrum, Mel-Frequency Cepstral Coefficients (MFCCs), and so on. Here a log-Mel energy spectrum of 40-dimension will be used as an example of the feature in the following.

(3) Feature stack: features of S frames are stacked to form longer feature vectors. S is the number of the frames to be stacked, which is also the number of features to be stacked, wherein S can be varied. For example, S=5, with a 40-dimension log-Mel energy spectrum, a feature vector of length 5*40=200 can be obtained. S frames are deemed as a sound segment, thus every 5 frames in a soundtrack can be set as a sound segment in the example above.

(4) Normalization: the stacked feature vectors are normalized so that the mean of the feature vectors will be 0, and the variance will be 1.

(5) In the expression (1) in the following, X is used to denote the normalized feature vector matrix which can be used as the input of polyphonic acoustic data or labeled monophonic acoustic data.

$$X = \begin{bmatrix} x_{(1)}^1, x_{(1)}^2, \ldots, x_{(1)}^n \\ x_{(2)}^1, x_{(2)}^2, \ldots, x_{(2)}^n \\ \ldots \\ x_{(m)}^1, x_{(m)}^2, \ldots, x_{(m)}^n \end{bmatrix}$$

wherein in the above matrix X, each row of the matrix X denotes a feature vector, corresponding to a sound segment; $X_i = x_{(i)}^1, x_{(i)}^2, \ldots, x_{(i)}^n$ is the i$^{th}$ feature vector, $x_{(i)}^j$ is the j$^{th}$ element of the i$^{th}$ feature vector, m is the number of all the feature vectors and n is the length of each feature vector.

The feature vectors of the polyphonic acoustic data can be fed into the trained neural network one (each row of the matrix X) at a time. The above-mentioned matrix expression of polyphonic/monophonic acoustic data is only an example, it should be clear that a person skilled in the art could use any other proper ways. Matrix expression should not be adversely deemed as limitation to the invention. Hence, the above-mentioned pre-processing is only an example, it should be clear that a person skilled in the art could use any other kinds of proper pre-processing methods thus it should not be adversely limit the scope of the invention.

Figure 5:
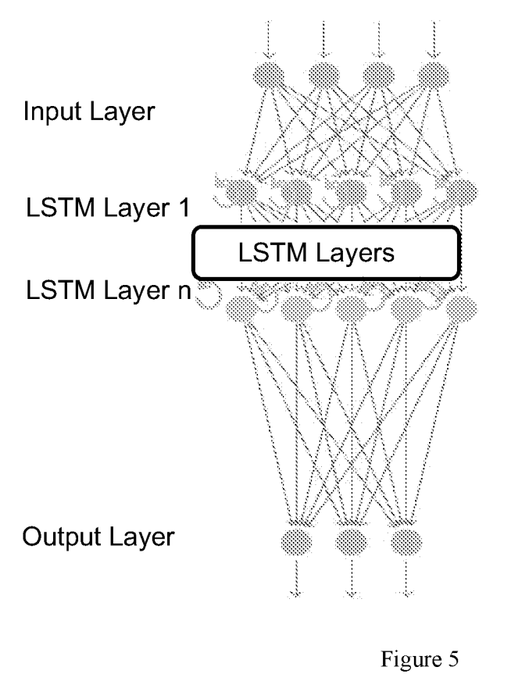
FIG. 5 shows a multiple layer RNN with LSTM (Long Short Term Memory) neurons.

There are no specific limitations on what kind of neural network could be used by embodiments of the invention, that is to say, any popular neural network, such as RNN (Recurrent Neural Network), CNN (Convolutional Neural Network), MLP (Multiple Layer Perception) and the like could be utilized. In the following, embodiments of the invention will be described with the utilized neural network being multilayer RNN with LSTM (Long Short-Term Memory) neurons as shown in FIG. 5, however it should be clear to a person skilled in the art that this is only for the purpose of illustration and will not adversely limit the scope of the invention. For the neural network example of FIG. 5, the number of neurons in the input layer should be equal to the length of each feature vector (e.g. 200 as discussed above). The number of neurons in the output layer is k, where k is the number of acoustic event classifications. The output value of the neuron means the possibility of the occurrence of the it event in the corresponding sound segment. The number of hidden layers and the number of neurons in each hidden layer can be determined with experiences, e.g. according to the data amount, the number of the classifications, computation capacity and the required degree of recognition accuracy. In the following, it will be described in detail of how to train the neural network with labeled monophonic acoustic data with reference to FIG. 4.

At block 403, a first output from a hidden layer of the trained neural network is obtained by one or more processing units. The first output could be obtained from, however not limited to the last hidden layer. The second last or the third last layer and the like could also be utilized from which to obtain the output. In practices, a person skilled in the art can adjust the obtaining of the first output according to the actual result. In the following, the first output from the hidden layer of the trained neural network can be expressed as a feature matrix H shown in the expression (2) in the following:

$$H = \begin{bmatrix} h_{(1)}^1, h_{(1)}^2, \ldots, h_{(1)}^t \\ h_{(2)}^1, h_{(2)}^2, \ldots, h_{(2)}^t \\ \ldots \\ h_{(m)}^1, h_{(m)}^2, \ldots, h_{(m)}^t \end{bmatrix} \quad (2)$$

wherein $H_i = h_{(i)}^1, h_{(i)}^2, \ldots, h_{(i)}^t$ is the transformed feature for the feature vector $X_i$, t is the number of the neurons in this hidden layer from which the first output is obtained.

At block 405, at least one acoustic classification of the polyphonic acoustic data is determined by one or more processing units based on the first output and a feature dictionary learnt from the trained neural network. How to determine the classification of the polyphonic acoustic data will be described in detail in the following with references to embodiments of the present invention. Upon the determination of at least one acoustic classification, at least one acoustic event is determined accordingly. With the determination of at least one acoustic event, applications of the detected acoustic event can be further utilized in many scenarios, such as the nondestructive anomaly detection and diagnosis of the industrial equipment, monitoring in smart home and that like.

Figure 6:
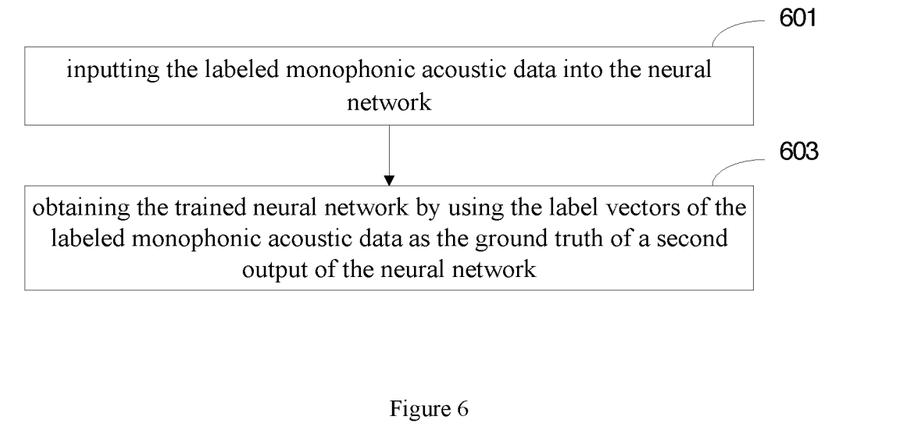
FIG. 6 is a flowchart illustrating another embodiment of the present invention to train a neural network.

FIG. 6 is a flowchart illustrating another embodiment of the present invention of how to train a neural network. At block 601, labeled monophonic acoustic data are inputted into a neural network by one or more processing units. As discussed above, the labeled monophonic acoustic data can be denoted as the matrix X of expression (1), and the labels of the labeled monophonic acoustic data can be denoted as the matrix L in the expression (3):

$$L = \begin{bmatrix} l_{(1)}^1, l_{(1)}^2, \ldots, l_{(1)}^k \\ l_{(2)}^1, l_{(2)}^2, \ldots, l_{(2)}^k \\ \ldots \\ l_{(m)}^1, l_{(m)}^2, \ldots, l_{(m)}^k \end{bmatrix} \quad (3)$$

wherein each row of the matrix L denotes a label, $L_i = l_{(i)}^1, l_{(i)}^2, \ldots, l_{(i)}^k$ is a one-hot label vector corresponding to a feature vector $X_i$, and k is the number of classifications of acoustic events, $l_{(i)}^j = 1$ if $X_i \in$ classification i, otherwise $l_{(i)}^j = 0$. The feature vectors of the matrix X will be inputted into the neural network one at a time.

At the block 603, the trained neural network is obtained by using the label vectors of the labeled monophonic acoustic data as the ground truth of a second output of the neural network. During the training process, the ground truth of the output of the neural network is the corresponding label. The network is trained to learn to output values approximating the label vectors.

Various kind of loss functions can be used for the training process of the neural network and in the following a cross-entropy loss function is used as an example for the purpose of illustration in which:

$$L = -\Sigma_{j=1}^s \Sigma_{i=1}^k p(y_{(j)}^i) \log q(y_{(j)}^i) \quad (3)$$

wherein, $p(y_{(j)}^i)$ is the ground truth of the $i^{th}$ output, $p(y_{(j)}^i) = l_{(j)}^i$, $q(y_{(j)}^i)$ is the output of the $i^{th}$ neuron for the $j^{th}$ feature vector, s here denotes the batch size mentioned above (such as s=5), which means the number of feature vectors used for one gradient decent process. To optimize the loss function L, any suitable gradient decent methods can be used, such as SGD (Statistical Gradient Decent), RMSProp, Adam (Adaptive Moment Estimation) and the like. The neural network's parameter will be updated and the neural network will learn to recognize acoustic events in the input acoustic tracks through the optimization of the loss function L (3). Then the trained neural network is obtained.

Figure 7:
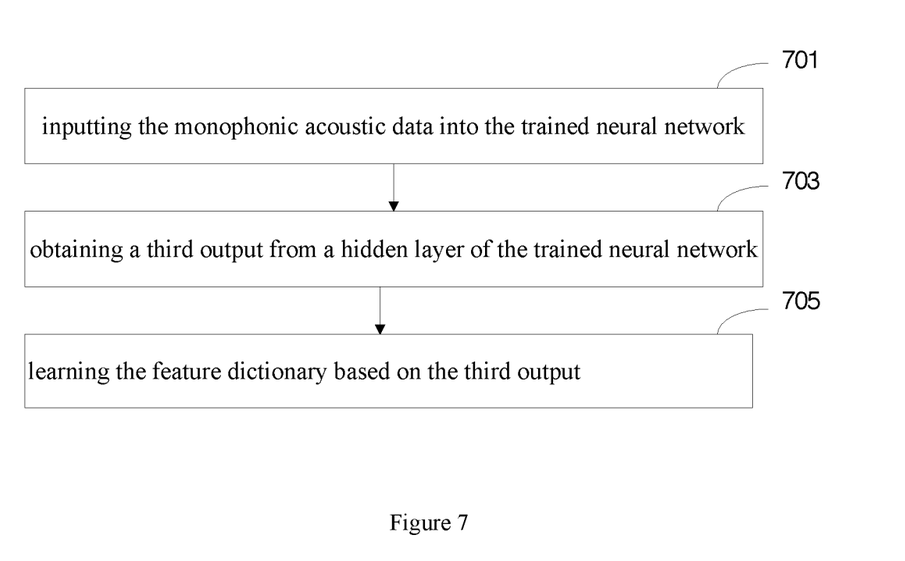
FIG. 7 is a flowchart illustrating another embodiment of the present invention to learn a feature dictionary.

FIG. 7 is a flowchart illustrating another embodiment of the present invention of how to learn a feature dictionary. In order to obtain the feature dictionary, the trained neural network is used as the feature transformer to transform the features of monophonic acoustic data. The output of a certain hidden layer in the trained neural network are used as the transformed features. At block 701, the monophonic acoustic data are inputted into the trained neural network by one or more processing units. The monophonic acoustic data are also denoted as the feature vector matrix X, and the feature vectors are inputted into the trained neural network one at a time.

At block 703, a third output from a hidden layer of the trained neural network is obtained by one or more processing units, with the third output being the same as the feature vector matrix H which has been discussed in the above.

At block 705, the feature dictionary is learned based on the third output by one or more processing units. After getting the feature vector matrix H, a feature dictionary can be learnt from it using any common dictionary learning algorithm, such as MOD (Method of Optimal Directions), K-SVD and the like. An exemplary dictionary learning method will be explained in details as below.

The purpose of feature dictionary leaning is to optimize the following object function for each acoustic classification i:

$$\min_{D_i} \|H_i + D_i A_i\|_2^2 + \lambda \|A_i\|_1 \text{ s.t.} \|d_j^i\|_2 \leq 1, \forall j = 1, \ldots, l_i \quad (4)$$

Here $H_i$ contains all the feature vectors of the $i^{th}$ acoustic classification. They are columns from $H^T$. $D_L$ is the feature dictionary for the $i^{th}$ class. $I_i$ is the number of dictionary items of classification i. Each column of $D_I$ is a vector of dimension t. Ai is a sparse matrix, λ is a variable which adjust the weight of sparsity, $d_j^i$ is the jth column of $D_i$. One dictionary will be obtained for each classification. Then all the feature dictionaries are stacked together, and get the aggregated feature dictionary D as expression (5). Obviously, D is a compact representation of feature matrix $H^T$.

$$D = \begin{Bmatrix} d_1^1 & d_2^1 & & d_{l1}^1 & d_{\ldots}^1 & & d_{l2}^1 & d_{\ldots}^1 & & d_{lk}^1 \\ d_1^2 & d_2^2 & \ldots & d_{l1}^2 & d_{\ldots}^2 & \ldots & d_{l2}^2 & d_{\ldots}^2 & \ldots & d_{lk}^2 \\ \ldots & \ldots & & \ldots & \ldots & & \ldots & \ldots & & \ldots \\ \underbrace{d_1^t \quad d_2^t}_{Class\ 1} & & \underbrace{d_{l1}^t \quad d_{\ldots}^t}_{} & & \underbrace{d_{l2}^t \quad d_{\ldots}^t}_{Class\ 2} & & \cdots & & \underbrace{d_{lk}^t}_{Class\ k} \end{Bmatrix} \quad (5)$$

Figure 8:
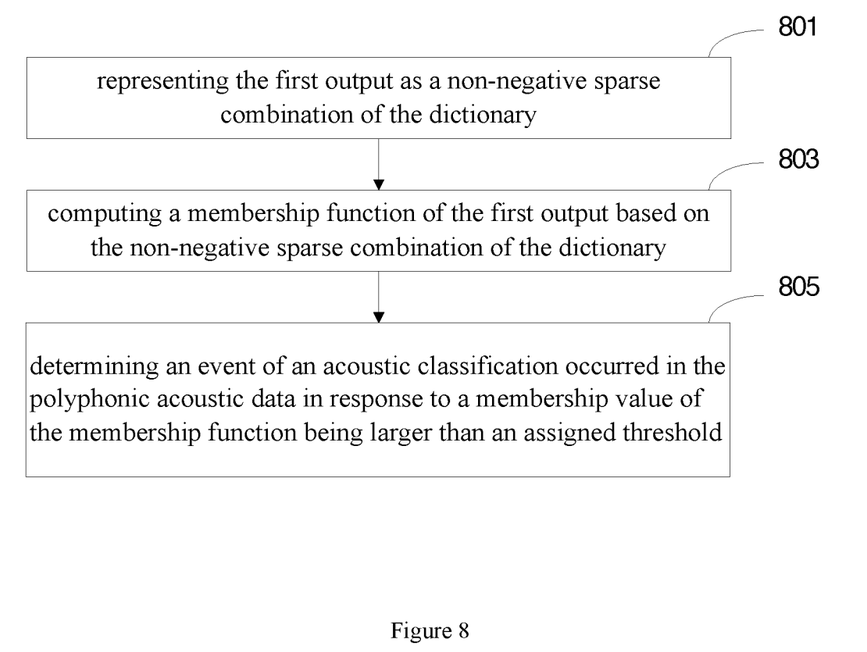
FIG. 8 is a flowchart illustrating another embodiment of the present invention to determine at least one acoustic classification.

FIG. 8 is a flowchart illustrating another embodiment of the present invention of how to determine at least one acoustic classification. At block 801, the first output is represented as the non-negative sparse combination of the feature dictionary by one or more processing units. The first output is the same as H, and the Hi is corresponding to the $i^{th}$ input feature vector as: $H_i = h_{(i)}^1, h_{(i)}^2, \ldots, h_{(i)}^t$. The output Hi can be represented as the non-negative sparse combination of feature dictionary D, which means:

$$H_i = D\alpha + e, \|\alpha\lambda_0 < \gamma, \alpha \quad (6)$$

wherein α is the sparse representation of $q_i$, e is the representation error, $\|\alpha\|_0$ is the L-0 norm of α. γ is the restriction of sparsity. This optimization problem can be described as:

$$\min_{\alpha_i} \|H_i + D\alpha_i\|_2^2 + \lambda \|\alpha_i\|_1 \text{ s.t. } \alpha \geq 0 \quad (7)$$

At block 803, a membership function of the first output H is computed based on the non-negative sparse combination of the dictionary by one or more processing units. The membership function is as following:

$$f(H_i, l) = \frac{\sum_{i=1}^l b_{li} \widetilde{\alpha_i}}{\sum_{i=1}^l \widetilde{\alpha_i}} \quad (8)$$

-continued $b_{li} = 1$ if $d_i \in C_l$ $b_{li} = 0$ Otherwise

Here $C_l$ is the $l^{th}$ event classification. I is the length of $\alpha_i$. $f(H_i,l)$ denotes the extent to which the event classification l is occurred in this sound segment, $\alpha_i$ is the same as that in formula (7), which is the sparse representation of $q_i$, $b_{li}$ is a classification index and the value of $b_{li}$ is 0 or 1.

At block 805, an event of an acoustic classification occurred in the polyphonic acoustic data is determined by one more processing units in response to a membership value being larger than an assigned threshold. That is, if the membership value $f(H_i,l)$ is larger than the assigned threshold $\tau$ (e.g. $\tau$=0.5, which can be predetermined), then the event of classification l is determined to have occurred in this sound segment. It should be appreciated that, the classification method described here is only for the purpose of illustration thus will not adversely limit the scope of the invention. Variations, modifications, additions of the described method based on the disclosure by those skilled in the art will fall into the scope of the invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   inputting, by one or more processing units, polyphonic acoustic data into a trained neural network trained by labeled monophonic acoustic data, wherein the trained neural network is trained by:
     inputting, by one or more processing units, the labeled monophonic acoustic data into the trained neural network; and
     obtaining, by one or more processing units, the trained neural network by using the label vectors of the labeled monophonic acoustic data as the ground truth of a second output of the trained neural network;
   obtaining, by one or more processing units, a first output from a hidden layer of the trained neural network; and
   determining, by one or more processing units, at least one acoustic classification of the polyphonic acoustic data based on the first output and a feature dictionary learnt from the trained neural network.

2. The method of claim 1, wherein the determining comprises:
   representing, by one or more processing units, the first output as a non-negative sparse combination of the dictionary;
   computing, by one or more processing units, a membership function of the first output based on the non-negative sparse combination of the dictionary; and
   determining, by one more processing units, an event of an acoustic classification occurred in the polyphonic acoustic data in response to a membership value of the membership function being larger than an assigned threshold.

3. The method of claim 1, wherein the feature dictionary is learnt by:
   inputting, by one or more processing units, the monophonic acoustic data into the trained neural network;
   obtaining, by one or more processing units, a third output from a hidden layer of the trained neural network; and
   learning, by one or more processing units, the feature dictionary based on the third output.

4. The method of claim 3, wherein the learning is used to optimize an object function for the at least one acoustic classification.

5. The method of claim 1, wherein the labeled monophonic acoustic data are denoted as feature vectors corresponding to a sound segment.

6. The method of claim 1, wherein the hidden layer is the last hidden layer.

7. The method of claim 1, wherein the trained neural network is a Recurrent Neural Network (RNN) with Long Short Term Memory (LSTM) neurons.

8. A computer system, comprising:
   a processor;
   a computer-readable memory coupled to the processor, the memory comprising instructions that when executed by the processor perform actions of:
   inputting polyphonic acoustic data into a trained neural network trained by labeled monophonic acoustic data, wherein the trained neural network is trained by:
     inputting the labeled monophonic acoustic data into the trained neural network; and
     obtaining the trained neural network by using the label vectors of the labeled monophonic acoustic data as the ground truth of a second output of the trained neural network;
   obtaining a first output from a hidden layer of the trained neural network; and
   determining at least one acoustic classification of the polyphonic acoustic data based on the first output and a feature dictionary learnt from the trained neural network.

9. The system of claim 8, wherein the determining comprises:
   representing the first output as a non-negative sparse combination of the dictionary;
   computing a membership function of the first output based on the non-negative sparse combination of the dictionary; and
   determining an event of an acoustic classification occurred in the polyphonic acoustic data in response to a membership value of the membership function being larger than an assigned threshold.

10. The system of claim 8, wherein the feature dictionary is learnt by:
    inputting the monophonic acoustic data into the trained neural network;
    obtaining a third output from a hidden layer of the trained neural network; and
    learning the feature dictionary based on the third output.

11. The system of claim 10, wherein the learning is to optimize an object function for the at least one acoustic classification.

12. The system of claim 8, wherein the labeled monophonic acoustic data are denoted as feature vectors corresponding to a sound segment.

13. The system of claim 8, wherein the hidden layer is the last hidden layer.

14. The system of claim 8, wherein the trained neural network is a Recurrent Neural Network (RNN) with Long Short Term Memory (LSTM) neurons.

15. A computer program product, comprising a computer readable non-transitory storage medium having program instructions embodied therewith, the program instructions being executable by a processor to perform a method comprising:

inputting polyphonic acoustic data into a trained neural network trained by labeled monophonic acoustic data, wherein the trained neural network is trained by:

inputting the labeled monophonic acoustic data into the trained neural network; and         obtaining the trained neural network by using the label vectors of the labeled monophonic acoustic data as the ground truth of a second output of the trained neural network;

obtaining a first output from a hidden layer of the trained neural network; and         determining at least one acoustic classification of the polyphonic acoustic data based on the first output and a feature dictionary learnt from the trained neural network.

16. The computer program product of claim 15, wherein the determining comprises:

representing the first output as a non-negative sparse combination of the dictionary;

computing a membership function of the first output based on the non-negative sparse combination of the dictionary; and     determining an event of an acoustic classification occurred in the polyphonic acoustic data in response to a membership value of the membership function being larger than an assigned threshold.

17. The computer program product of claim 15, wherein the feature dictionary is learnt by:

inputting the monophonic acoustic data into the trained neural network;

obtaining a third output from a hidden layer of the trained neural network; and     learning the feature dictionary based on the third output.

\* \* \* \* \*